Figure 2:
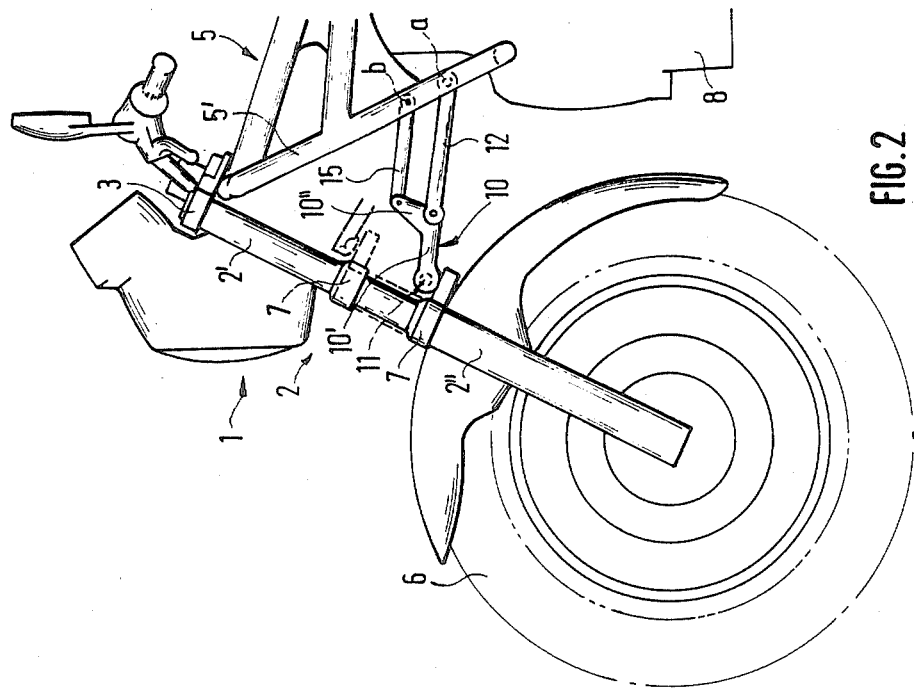

United States Patent [19]

Baron

[11] Patent Number: 4,738,468

[45] Date of Patent: Apr. 19, 1988

[54] FRONT WHEEL SUSPENSION FOR A MOTORCYCLE

[75] Inventor: Günter Baron, Neu-Esting, Fed. Rep. of Germany

[73] Assignee: Bayerische Motoren Werke, AG, Fed. Rep. of Germany

[21] Appl. No.: 850,159

[22] Filed: Apr. 10, 1986

[30] Foreign Application Priority Data

Apr. 18, 1985 [DE] Fed. Rep. of Germany ....... 3513974

[51] Int. Cl.[4] .............................................. B62D 1/00
[52] U.S. Cl. .................................. 280/771; 280/276
[58] Field of Search ................ 280/771, 92, 275, 276, 280/277, 283, 286

[56] References Cited

U.S. PATENT DOCUMENTS

| 4,082,307 | 4/1978 | Tait | 280/277 |
| 4,179,135 | 12/1979 | Slater | 280/276 |

FOREIGN PATENT DOCUMENTS

| 2431416 | 2/1980 | France | 280/276 |
| 1319703 | 6/1973 | United Kingdom . | |
| 1540824 | 2/1979 | United Kingdom | 280/277 |
| 2021496 | 11/1982 | United Kingdom . | |
| 2154960 | 9/1985 | United Kingdom | 280/276 |

OTHER PUBLICATIONS

*Motorrad*, vol. 25/84, pp. 67–70.

*Primary Examiner*—John J. Love
*Assistant Examiner*—Ross Weaver
*Attorney, Agent, or Firm*—Barnes & Thornburg

[57] ABSTRACT

A front wheel suspension of a motorcycle includes a front wheel fork with an upper fork bridge and a lower fork bridge. A bell crank is pivotally connected at the lower fork bridge by way of a ball joint located in the wheel center plane; two guide arms are pivotally connected at the rear corner area of the bell crank by way of a bearing shaft which in their turn are pivotally connected at the motorcycle frame. Two lever arms project upwardly from the bell crank, at the end sections of which one guide member each is pivotally connected by way of a bearing bolt; the guide members in turn are also pivotally connected at the motorcycle frame. During the inward spring movement of the front wheel fork, the ball joint of the bell crank is displaced slightly forwardly and the resulting wheel base change is reduced thereby.

6 Claims, 1 Drawing Sheet

U.S. Patent

Apr. 19, 1988

4,738,468

FRONT WHEEL SUSPENSION FOR A MOTORCYCLE

The present invention relates to a front wheel suspension for a motorcycle of the type described in the German publication "Motorrad", Volume 25/84, page 67.

The prior art front wheel suspension includes two forwardly converging guide arms for the support of the lower fork bridge at the motorcycle frame. These guide arms are pivotally connected with their forward end at the lower fork bridge by way of a ball joint whereas they are pivotally connected with their rear end at the motorcycle frame by way of a horizontal bearing shaft. During the inward spring movement (spring compression) of the front wheel fork—caused, for example, by the braking—the front wheel fork is pressed forwardly by the two guide arms; nonetheless, during this operation, a wheel base change occurs during this operation which may be relatively large under certain circumstances.

It is therefore the object of the present invention to so construct a front wheel suspension of the type mentioned hereinabove that the wheel base changes only slightly during the inward spring movement of the front wheel fork.

The underlying problems are solved according to the present invention by a bell crank which is pivotally connected in its corner area at the forward end of the guide arm by way of a corner-rigid transverse shaft and which is connected by means of a forwardly directed first lever arm with the lower fork bridge and which is pivotally connected by means of a second lever arm extending at an angle to the first lever arm, with a guide member which, in turn, is pivotally connected at the motorcycle frame about a transverse axis.

A wheel base change of the front wheel fork is far-reachingly reduced over the spring travel of the front wheel suspension—for example, during the braking—by the bell crank or angle lever provided in accordance with the present invention. For the ball joint of the angle lever is slightly displaced forwardly by way of the guide member by the inwardly spring movement of the front wheel suspension and the wheel base change is considerably reduced thereby. As the motorcycle handlebar is pivoted thereby comparatively less about the upper ball joint, the handling and driving feel is also improved thereby; this is particularly of significance with an upwardly directed handlebar. Finally, a comparatively longer positive caster results during the braking from the smaller wheel base change which in particular becomes effective thereby very favorably on the driving stability.

Appropriately, the second lever arm of the bell crank connected with the guide member extends upwardly. By the use of two upwardly projecting lever arms, one guide member of its own may be coordinated to each of these two lever arms which in turn is pivotally connected at the motorcycle frame; furthermore, two guide arms disposed at a distance from one another are pivotally connected within the corner area of the bell crank.

By a different dimensioning of the length of the guide arms, of the guide members, and of the second lever arms of the bell crank or angle lever as well as by a particular arrangement of the places of pivotal connection of the guide arms and guide members on the frame side, the magnitude of the wheel base change can also be varied and brought to a minimum value, if so desired.

Figure 1:
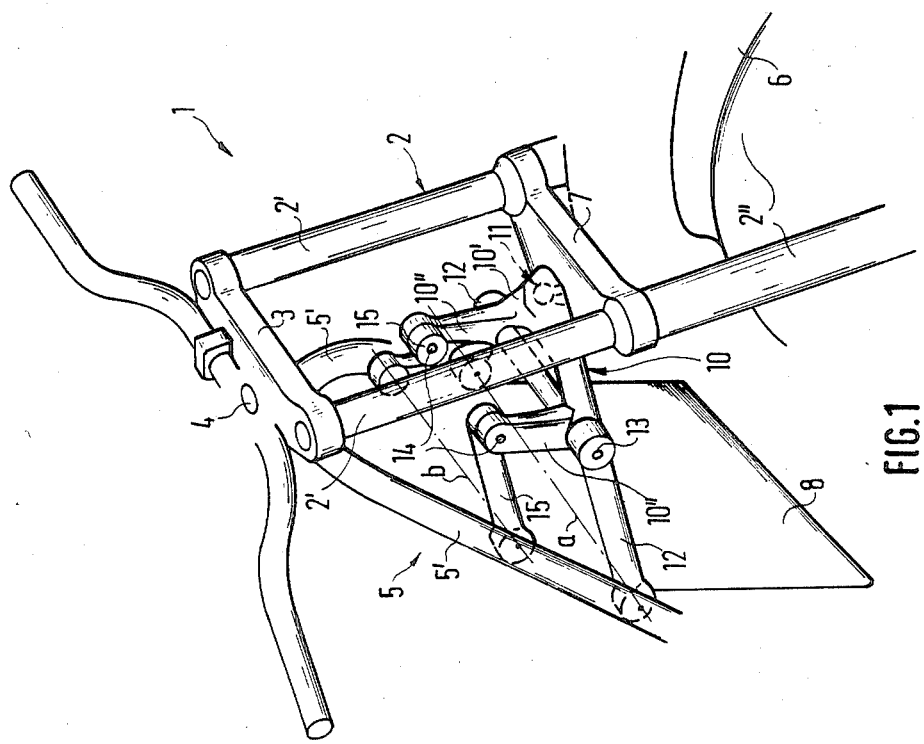

These and other objects, features and advantages of the present invention will become more apparent from the following description when taken in connection with the accompanying drawing which shows, for purposes of illustration only, one embodiment in accordance with the present invention, and wherein:

FIG. 1 is a perspective overall view of a motorcycle front wheel suspension in accordance with the present invention; and FIG. 2 is a side elevational view of the front wheel suspension of FIG. 1.

Referring now to the drawing wherein like reference numerals are used throughout the two views to designate like parts, the front wheel suspension generally designated by reference numeral 1 of a motorcycle which is illustrated in FIGS. 1 and 2 includes a front wheel fork generally designated by reference numeral 2 which is pivotally connected by way of its upper fork bridge 3 by means of a ball joint 4 at the upwardly extending end area of the motorcycle frame generally designated by reference numeral 5. Two vertical tubular members 2' thereby project down from the upper fork bridge 3, over which two tubular slide members 2", connected by a lower fork bridge 7, are displaceable in the longitudinal direction; a front wheel 6 is rotatably supported at the lower ends of the tubular slide members 2". The lower fork bridge 7 is constructed V-shaped in plan view, whereby its tip is directed toward an engine transmission housing 8 secured at the motorcycle frame 5.

A ball pin directed upwardly projects from the lower fork bridge 7 which engages in a ball socket provided at the bottom side of a bell crank or angle lever generally designated by reference numeral 10. The ball socket forms together with the ball pin a ball joint 11 whose center point lies in the wheel center plane of the front wheel 6. The bell crank 10 is constructed V-shaped in plan view whereby the ball socket is located in a first forwardly directed lever arm 10' whereas two guide arms are pivotally connected by way of a bearing shaft 13 in the rearward corner area of the bell crank 10 as well as at the outsides thereof. The guide arms 12, in their turn, are pivotally connected with their rear end sections at the forward lateral frame sections 5' of the motorcycle frame about a horizontally extending transverse axis a; adjacent thereto, the frame sections 5' are threadably connected with the engine transmission housing 8.

As can be readily seen in FIGS. 1 and 2, two upwardly projecting second lever arms 10" are provided at the backside of the angle lever or bell crank 10, i.e., in its corner area, which are disposed at a distance from one another and are aligned with one another. A guide member 15 each is pivotally connected to the upper end sections of the second lever arms 10" by way of a bearing bolt 14 each; the guide members 15 are pivotally connected with their rear end sections at the frame sections 5' of the motorcycle frame 5, whereby the cross axis b of the guide members 15 extends parallel to the cross axis a of the guide arms 12. Both the guide arms 12 as also the guide members 15 extend symmetrically converging toward the bell crank 10 as viewed in plan view. Furthermore, the guide arms 12 and the guide members 15 extend parallel to one another at the same distance and in the rest position of the front wheel fork 2 extend in the illustrated embodiment obliquely upwardly from their point of pivotal connection at the frame toward the angle lever 10.

Owing to the described pivotal connection of the front fork 2 by way of the bell crank 10, the guide arms 12 and the guide members 15 at the motorcycle frame 5, the ball joint 11 of the bell crank 10 is displaced slightly forwardly over the spring travel of the front fork 2 during the inward spring movement thereof—for example, during the braking—principally by the forward pivoting of the end sections of the second lever arms 10″ and the wheel base change of the front wheel 6 which occurs thereby is far-reachingly reduced as a result thereof; since the positive caster is thereby longer in comparison to the state of the art, this becomes effective advantageously on the driving stability, especially during the braking.

The wheel base of the front wheel 6 can be reduced, in case of need, to a minimum value by a corresponding pivotal connection of the guide arms 12 and of the guide members 15 at the frame as well as by a differing dimensioning of the length thereof and of the length of the second lever arms 10″ of the angle lever 10 or also a defined magnitude may be provided whereby, of course, also the steering head angle can be varied. In the extreme case, the front wheel fork 2 may even be displaced forwardly beyond its normal rest position.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A front wheel suspension for a motorcycle, comprising a front wheel fork including upper and lower fork bridge means, motorcycle frame means, the upper fork bridge means being pivotally connected at the motorcycle frame means, the lower fork bridge means being operatively connected with the motorcycle frame means by at least one first guide arm means, said first guide arm means being pivotally supported with its rear end at the motorcycle frame means about a cross axis, bell crank means which in its corner area is pivotally connected at the forward end of the first guide arm means by way of a corner-rigid transverse shaft, said bell crank means being operatively connected with a forwardly directed first lever arm with the lower fork bridge means by way of a ball joint located substantially in the wheel center plane and with a second lever arm extending at an angle to the first lever arm being pivotally connected with second guide arm means and said second guide arm means being pivotally connected at the motorcycle frame means about a cross axis, said first and second guide arm means cooperating with said bell crank means to press said front wheel fork forwardly away from said motorcycle frame means during spring compression of said front wheel fork, said lower fork bridge means being movable with said front wheel fork during said spring compression.

2. A front wheel suspension according to claim 1, wherein the second lever arm of the bell crank means which is operatively connected with the second guide arm means is directed upwardly.

3. A front wheel suspension according to claim 2, wherein said second guide arm means includes two forwardly converging guide arms, and wherein the bell crank means includes two lever arms projecting upwardly, disposed at a distance from one another and substantially aligned with one another, one guide arm each being coordinated to each of the two upwardly projecting lever arms whereas the guide arms are pivotally connected in the corner area of the bell crank means.

4. A front wheel suspension according to claim 1, wherein said second guide arm means includes two forwardly converging guide arms, and wherein the bell crank means includes two lever arms projecting upwardly, disposed at a distance from one another and substantially aligned with one another, one guide arm each being coordinated to each of the two upwardly projecting lever arms whereas the guide arms are pivotally connected in the corner area of the bell crank means.

5. A front wheel suspension according to claim 1, wherein the upper fork bridge means is pivotally connected at the frame means by way of a ball joint.

6. A front wheel suspension according to claim 1, wherein said first and second guide arm means each include a pair of guide arms, wherein the guide arms of said first guide arm means and the guide arms of said second guide arm means remain substantially parallel during spring compression of said front wheel fork.

* * * * *